July 13, 1954  V. E. CADWELL  2,683,381
BRAKE LOCKING DEVICE
Filed July 31, 1952
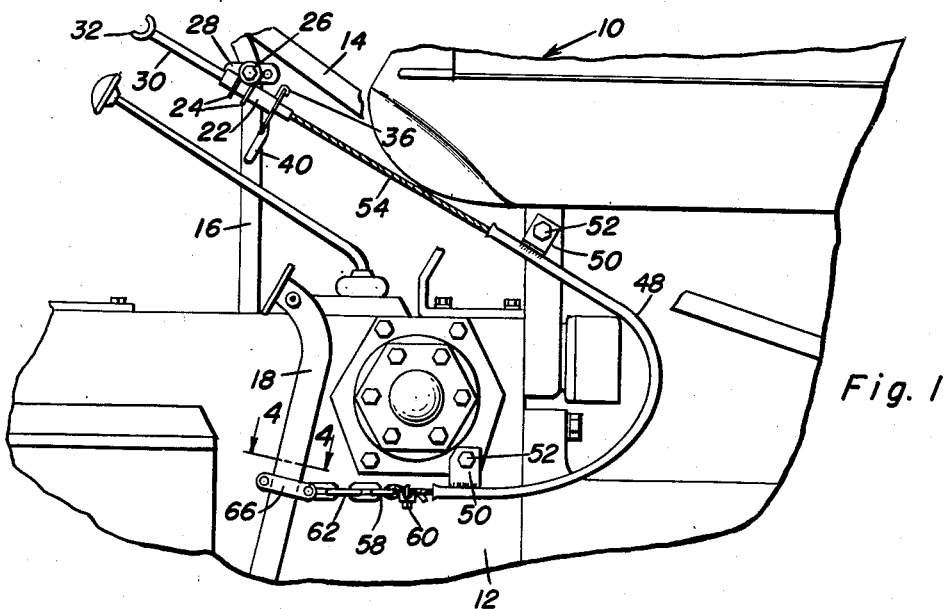
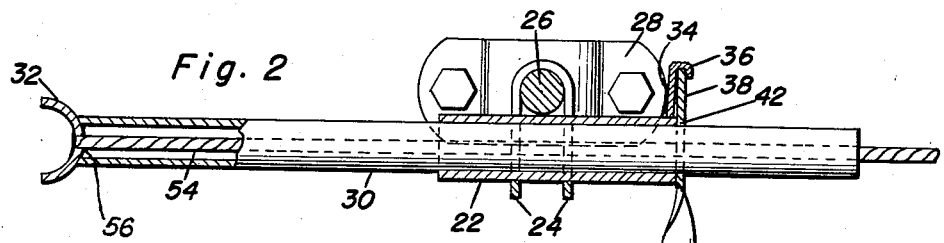
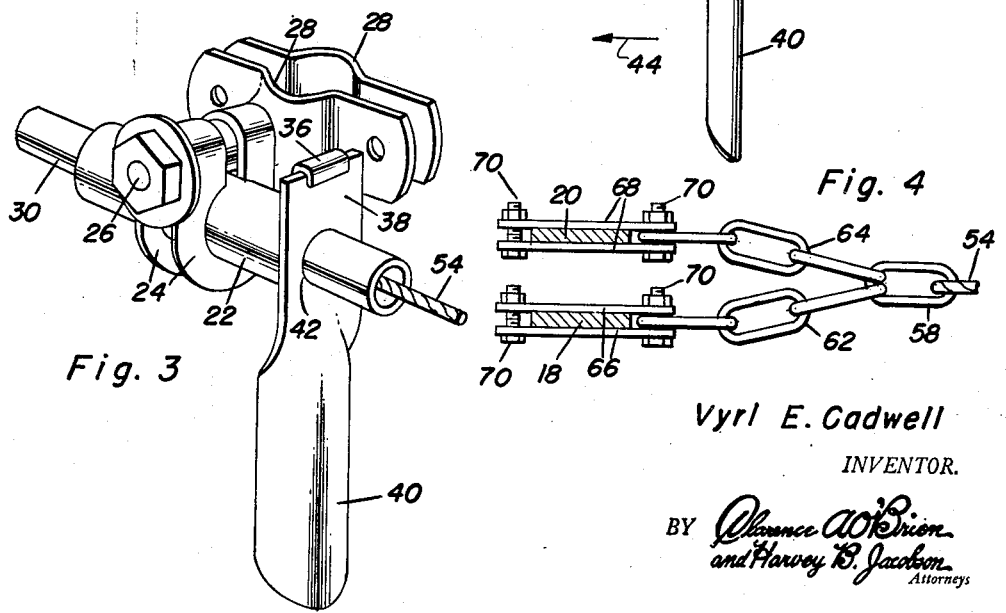
Vyrl E. Cadwell
INVENTOR.

Patented July 13, 1954

2,683,381

UNITED STATES PATENT OFFICE 2,683,381

BRAKE LOCKING DEVICE

Vyrl E. Cadwell, Botna, Iowa

Application July 31, 1952, Serial No. 301,877

3 Claims. (Cl. 74—481)

This invention relates to new and useful improvements and structural refinements in brake locking devices, and the principal object of the invention is to facilitate convenient, expeditious and dependable locking of dual brake pedals of a tractor in a depressed or "brakes on" position.

Dual brake pedals of this type, adapted for independent actuation, may be depressed simultaneously and means are sometimes provided for locking the pedals in a depressed position. However, such means are usually located on the pedals themselves and, therefore, cannot be set or released without the operator of the tractor substantially shifting his position on the tractor seat.

An important feature of the instant invention resides in the provision of means for locking the brake pedals by the actuation of a hand grip which is conveniently located adjacent the steering wheel, while another feature of the invention lies in the provision of means for releasing the lock, which means are also readily and conveniently accessible.

Some of the advantages of the invention reside in its simplicity of construction, in its dependable operation, and in its adaptability for installation on tractors of different types.

With the above more important objects and features in view, and such other objects and features as may become apparent as this specification proceeds, the invention consists essentially of the arrangement and construction of parts as illustrated in the accompanying drawings, in which:

Figure 1 is a fragmentary side elevational view of a tractor, showing the invention installed thereon;

Figure 2 is a side elevational view, on an enlarged scale and partially broken away, showing the control handle, hand grip, sleeve, attaching clamp and latch used in the invention;

Figure 3 is a perspective view of the sleeve, attaching clamp, handle and latch; and Figure 4 is a fragmentary sectional view, taken substantially in the plane of the line 4—4 in Figure 1.

Like characters of reference are employed to designate like parts in the specification and throughout the several views.

Referring now to the accompanying drawings in detail, the general reference character 10 designates a tractor including a frame 12, a steering column 14, a steering column supporting post 16, and a pair of independently actuable brake pedals 18, 20 (see Figure 4).

The instant invention resides in the provision of a brake pedal locking device, the same embodying in its construction an open ended, tubular sleeve 22 which is rigidly held in a clamp 24, the latter being secured on a stud 26 of a second clamp 28 which, in turn, is mounted on the steering column supporting post 16 so that the sleeve 22 is disposed in an inclined position adjacent the steering wheel (not shown). A tubular handle 30 is slidable in the sleeve 22 and the upper end of the handle is provided with a hand grip 32.

The lower end of the sleeve 22 has secured thereto a plate-shaped member 34 having an angulated portion constituting a channel-shaped fulcrum 36 which is engaged by a flat end portion 38 of a latch 40.

The flat portion 38 of the latch 40 is provided with an aperture 42 which is slightly larger in diameter than the handle 30 which extends therethrough, so that when the handle is pulled upwardly in the direction of the arrow 44, the latch 40 will frictionally engage and bind the handle to lock the same against downward sliding. However, by simply tripping the latch 40 in the direction of the arrow 44, the binding effect of the latch on the handle 30 will be relieved and downward sliding of the handle in the sleeve 22 will be facilitated.

An arcuate, substantially U-shaped tubular guide 48 is provided adjacent the end thereof with apertured ears 50 whereby it may be rigidly secured to the frame 12 of the tractor by suitable bolts 52, one end of the guide being in substantial axial alignment with the aforementioned sleeve 22 and handle 30, while the other end of the guide is directed toward and disposed centrally between the brake pedals 18, 20. A flexible cable 54 is freely slidable in this guide and one end portion of the cable extends into the tubular handle 30 and is anchored to the hand grip 32 as indicated at 56. The other end of the cable 54 is looped through an eye 58 and is anchored to itself by a clamp 60.

A pair of individual chains 62, 64 are connected at one end thereof to the eye 58 and are also connected at their other end to clamps 66, 68 on the respective pedals 18, 20. The clamps 66, 68 simply assume the form of pairs of straps which are clamped against the respective pedals by suitable bolts 70, and as is clearly shown in Figure 4, one of these bolts in each clamp also serves as connecting means for the associated chain 62 or 64, as the case may be.

When it is desired to apply the brakes, the hand grip 32 is simply pulled upwardly, that is, in the direction of the arrow 44, whereby the cable 54 will simultaneously draw the two brake pedals 18, 20 to their depressed positions, wherein they will be locked by the latch 40 and will so remain until the latch is tripped in the direction of the arrow 46 to permit sliding of the handle 30 in the sleeve 22.

It is to be particularly noted that when the brakes are released and the handle 30 is in its unlocked position, the individual chains 62, 64 will permit the pedals 18, 20 to be individually actuated in the conventional manner and without interference from the lock mechanism.

It is believed that the advantages and use of the invention will be readily understood from the foregoing disclosure and therefore, further description thereof at this point is deemed unnecessary.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

1. The combination of a tractor including a frame, a steering wheel and a pair of juxtaposed and independently actuable brake pedals, and a brake lock comprising a sleeve mounted on the tractor adjacent said steering wheel, a cylindrical handle slidable in said sleeve, a hand grip at one end of said handle, an apertured latch fulcrummed on said sleeve and frictionally engaging said handle to releasably lock the same against sliding in the sleeve, a tubular guide secured to said frame, a flexible cable connected at one end thereof to said handle and extending through said guide, and a pair of flexible connecting elements provided at the other end of said cable and attached to the respective brake pedals.

2. A brake locking device for vehicles having a pair of juxtaposed and independently actuable brake pedals, said device comprising a sleeve adapted to be mounted on a vehicle, a tubular handle slidable in said sleeve, a fulcrum member provided at one end of the sleeve, an apertured latch having one end thereof in engagement with said fulcrum member and having said handle extending through the aperture thereof whereby to frictionally engage the handle and lock the same against sliding in the sleeve, a tubular guide adapted to be secured to the stated vehicle, a flexible cable connected at one end thereof to said handle and extending through said guide, and means for operatively connecting the other end of said cable to a pair of brake pedals, wherein said means comprising an eye provided on said cable, a pair of chains connected at one end thereof to said eye, and a pair of brake pedal clamps provided at the other end of the respective chains.

3. For use with the brake pedal of a tractor, a brake lock comprising a tubular guide member mounted on said tractor, a guide sleeve mounted on said tractor, one end of said tubular guide being in alignment with said guide sleeve, the other end of said tubular guide being in alignment with the path of movement of said brake pedal, a rod slidable in said guide sleeve, a flexible tension member extending through said tubular guide, one end of said flexible member being secured to said brake pedal, the other end of said flexible member being secured to said rod, a fulcrum plate fixed adjacent the end of said guide sleeve in proximity to said tubular guide, a latch secured to said fulcrum plate at a point spaced from said guide sleeve, said latch plate extending across the end of said guide sleeve, said latch having an aperture, said rod extending through said aperture.

References Cited in the file of this patent

UNITED STATES PATENTS

| Number | Name | Date |
|---|---|---|
| 1,199,578 | Latta | Sept. 26, 1916 |
| 1,503,326 | Lane | July 29, 1924 |
| 1,681,191 | McBride | Aug. 21, 1928 |
| 1,718,258 | Schmidt | June 25, 1929 |
| 2,154,929 | Edwards | Apr. 18, 1939 |
| 2,233,329 | Sprink | Feb. 25, 1941 |
| 2,443,331 | Stewart | June 15, 1948 |
| 2,531,216 | Haver | Nov. 21, 1950 |
| 2,535,718 | Bintz | Dec. 26, 1950 |